US012135302B2

(12) United States Patent
Kornbluth et al.

(10) Patent No.: US 12,135,302 B2
(45) Date of Patent: Nov. 5, 2024

(54) SENSING DEVICE COMPENSATING FOR CROSS-SENSITIVITY TO ANALYTES

(71) Applicant: Robert Bosch GmbH, Stuttgart (DE)

(72) Inventors: Mordechai Kornbluth, Brighton, MA (US); Shilpa Pant, Singapore (IN); Kaushal Sagar, Singapore (IN)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 17/697,515

(22) Filed: Mar. 17, 2022

(65) Prior Publication Data

US 2023/0296545 A1    Sep. 21, 2023

(51) Int. Cl.
| G01N 27/06 | (2006.01) |
| B01L 3/00 | (2006.01) |
| G01N 21/64 | (2006.01) |
| G01N 21/77 | (2006.01) |
| G01N 27/327 | (2006.01) |
| G01N 27/333 | (2006.01) |

(52) U.S. Cl.
CPC ........ *G01N 27/06* (2013.01); *B01L 3/502715* (2013.01); *G01N 21/64* (2013.01); *B01L 2300/0645* (2013.01); *B01L 2300/0654* (2013.01)

(58) Field of Classification Search
CPC .... G01N 27/06; G01N 27/327; G01N 27/333; G01N 21/64; G01N 21/6456; G01N 21/6428; G01N 21/77
See application file for complete search history.

(56) References Cited

U.S. PATENT DOCUMENTS

| 6,379,969 | B1 | 4/2002 | Mauze et al. |
| 8,956,875 | B2 | 2/2015 | Kahaian et al. |
| 10,444,249 | B2 | 10/2019 | Fukushima et al. |
| 2014/0295430 | A1 | 10/2014 | Saito et al. |

(Continued)

FOREIGN PATENT DOCUMENTS

GB    2412657 A    10/2005

OTHER PUBLICATIONS

Cherkas et al., "Measurement of intracellular concentration of fluorescently-labeled targets in living cells," PLoS One, Apr. 25, 2018, vol. 13, No. 4, pp. 1/21-21/21, https://doi.org/10.1371/journal.pone.0194031.

(Continued)

*Primary Examiner* — Neel D Shah
(74) *Attorney, Agent, or Firm* — Brooks Kushman P.C.

(57) ABSTRACT

A sensing device including film sensor, a second sensor, and a controller. The film sensor includes a receptor capturing an intended analyte and an unintended analyte in a fluid medium to generate a film sensor signal. The receptor has a receptor cross-sensitivity to the unintended analyte. The second sensor contacts the fluid medium including the intended analyte and the unintended analyte to generate a second sensor signal. The second sensor has a second cross-sensitivity to the unintended analyte different than the receptor cross-sensitivity to the unintended analyte. The controller is programmed to determine a concentration of the intended analyte in the fluid medium in response to the film sensor signal, the receptor cross-sensitivity, the second sensor signal, and the second cross-sensitivity.

20 Claims, 5 Drawing Sheets

(56) References Cited

U.S. PATENT DOCUMENTS

| | | |
|---|---|---|
| 2016/0033413 A1 | 2/2016 | Chodavarapu et al. |
| 2017/0362648 A1 | 12/2017 | Hassibi et al. |
| 2019/0000364 A1* | 1/2019 | Balaconis .......... A61B 5/14556 |
| 2019/0167162 A1* | 6/2019 | Li .................... A61B 5/1473 |
| 2020/0033313 A1 | 1/2020 | Meeusen et al. |
| 2020/0033314 A1 | 1/2020 | Schwabacher et al. |

OTHER PUBLICATIONS

Carter et al., "Fluorescent Sensors for Measuring Metal Ions in Living Systems," Chemical Reviews, 2014, vol. 114, pp. 4564-4601, DOI: 10.1021/cr400546e.

Daly et al., "Current developments in fluorescent PET (photoinduced electron transfer) sensors and switches," Chem. Soc. Rev., 2015, vol. 44, pp. 4203-4211, DOI: 10.1039/c4cs00334a.

Jurchenko et al., "Lighting Up the Force: Investigating Mechanisms of Mechanotransduction Using Fluorescent Tension Probes," Molecular and Cellular Biology, Aug. 2015, vol. 35, No. 15, pp. 2570-2582, DOI: 10.1128/MCB.00195-15.

Laidler, "The Entropies of Ion in Aqueous Solution," Canadian Journal of Chemistry, Aug. 1956, vol. 34, No. 8, pp. 1107-1113, https://dx.doi.org/10.1139/v56-144.

Poisson et al., "Diffusion Coefficients of Major Ions in Seawater," Marine Chemistry, 1983, vol. 13, pp. 265-280.

Qi et al., "Fluorescent pH Sensors for Broad-Range pH Measurement Based on a Single Fluorophore," Analytical Chemistry, Apr. 20, 2015, vol. 87, 5897-5904, DOI: 10.1021/acs.analchem.5b00053.

* cited by examiner

SENSING DEVICE COMPENSATING FOR CROSS-SENSITIVITY TO ANALYTES

The following application is related to the present application: U.S. patent application Ser. No. 16/931,855 filed on Jul. 17, 2020 and published as US 2022/0018775 on Jan. 20, 2022. This application is incorporated by reference in its entirety herein.

TECHNICAL FIELD

The present disclosure relates to a sensing device compensating for cross-sensitivity to analytes.

BACKGROUND

Calcium ($Ca^{2+}$) and magnesium ($Mg^{2+}$) ions are generally responsible for the hardness of water. Elevated levels of calcium and magnesium ions in water affect the performance and maintenance of appliances contacting the water. Efficiently detecting and monitoring a total hardness of water may be beneficial to a user, such as helping the user maintain water quality and improve the performance of appliances.

SUMMARY

According to one embodiment, a sensing device including film sensor, a second sensor, and a controller is disclosed. The film sensor includes a receptor capturing an intended analyte and an unintended analyte in a fluid medium to generate a film sensor signal. The receptor has a receptor cross-sensitivity to the unintended analyte. The second sensor contacts the fluid medium including the intended analyte and the unintended analyte to generate a second sensor signal. The second sensor has a second cross-sensitivity to the unintended analyte different than the receptor cross-sensitivity to the unintended analyte. The controller is programmed to determine a concentration of the intended analyte in the fluid medium in response to the film sensor signal, the receptor cross-sensitivity, the second sensor signal, and the second cross-sensitivity.

According to another embodiment, a sensing device includes an optical sensor, a second sensor, and a controller. The optical sensor detects fluorescence emitted by an intended analyte and an unintended analyte in a fluid medium and captured on a receptor to generate an optical sensor signal. The optical sensor has an optical cross-sensitivity to the unintended analyte. The second sensor contacts the fluid medium including the intended analyte and the unintended analyte to generate a second sensor signal. The second sensor has a second cross-sensitivity to the unintended analyte different than the optical cross-sensitivity to the unintended analyte. The controller is programmed to determine a concentration of the intended analyte in the fluid medium in response to the optical sensor signal, the optical cross-sensitivity, the second sensor signal, and the second cross-sensitivity.

According to yet another embodiment, a method of determining a concentration of an intended analyte in a fluid medium is disclosed. The method includes receiving a film sensor signal indicative of the intended analyte and an unintended analyte in the fluid medium and being captured on a receptor of a film sensor. The receptor has a receptor cross-sensitivity to the unintended analyte. The method further includes receiving a second sensor signal indicative of the fluid medium including the intended analyte and the unintended analyte contacting a second sensor. The second sensor has a second cross-sensitivity to the unintended analyte different than the receptor cross-sensitivity to the unintended analyte. The method also includes determining the concentration of the intended analyte in the fluid medium in response to the film sensor signal, the receptor cross-sensitivity, the second sensor signal, and the second cross-sensitivity.

DETAILED DESCRIPTION

Figure 1:
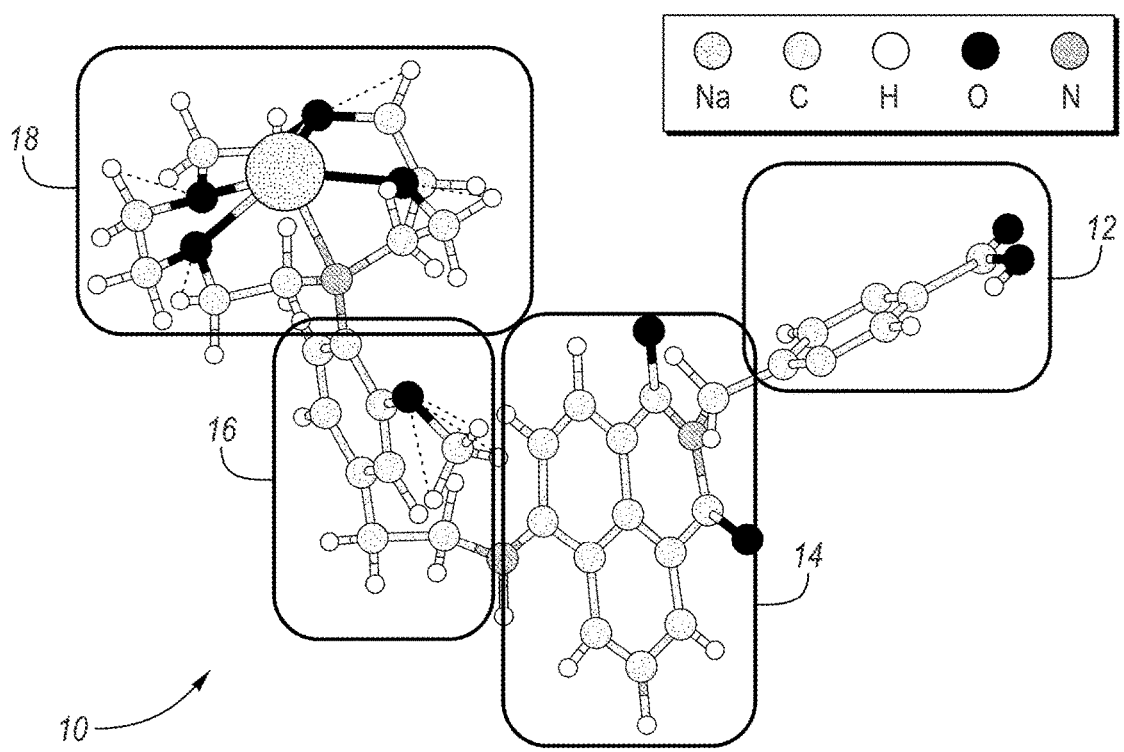
FIG. 1 depicts a schematic diagram of a chemosensor detecting ion concentration using fluorescence-based detection.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

Reference is being made in detail to compositions, embodiments, and methods of embodiments known to the inventors. However, disclosed embodiments are merely exemplary of the present disclosure which may be embodied in various and alternative forms. Therefore, specific details disclosed herein are not to be interpreted as limiting, rather merely as representative bases for teaching one skilled in the art to variously employ the present disclosure.

Hard water may contain Ca and/or Mg ions. These ions may cause mineral buildup and/or residue (e.g., calcium carbonate) in appliances thereby creating poor heat transport through the appliance. This mineral buildup and/or residue may be especially problematic in hot water systems (e.g., heat exchangers and dishwashers) that rely on thermal flow to operate effectively. Dissolved calcium ions tend to react with carbon dioxide at a high temperature to from calcium carbonate (otherwise referred to as limescale), which is thermally insulating. Moreover, this reaction may lead to film buildup in other appliances (e.g., dishwashers).

Devices have been proposed to detect the amount of hard water ions in water. Water softeners have been proposed to attempt to address the mineral buildup in appliances. Certain water softeners are added to water at a concentration and then applied to the appliances to counteract mineral buildup. The concentration of water softener desired may depend on the amount of Ca, Na, and/or Mg ions present in the water. Ca ion sensors have been proposed with a cross-sensitivity to determine an amount of Na ions present in addition to Ca ions present. What is needed is a sensing device that detects the amount of first and second hard water ions in a solution using an ion sensor by compensating for cross-sensitivity.

One or more embodiments disclose a sensing device detecting an amount of first and second analytes (e.g., first and second hard water ions) in a fluid medium using ion sensors and the temperature and/or conductivity of the solution to compensate for cross-sensitivity. In one or more embodiments, the sensing device detects the amount of other analyte groups (e.g., toxic metal groups).

One approach for ion sensing is fluorescence-based detection where an ion attaches to a molecule that causes or quenches a fluorescence. An optical reading (e.g., using a photodiode) may be used to directly measure an ion concentration. FIG. 1 depicts a schematic diagram of chemosensor 10 detecting ion concentration using fluorescence-based detection. Chemosensor 10 includes anchor 12 serving as a tethering matrix. The tethering matrix may include, but not limited to, cellulose microparticles, cellulose films, polymethyl methacrylate (PMMA), polystyrene (PS) microparticles, polyethlene terephthalate (PET) layers, or silicone. The tethering matrix may have a size in a range of 1 to 100 μm and may be embedded within hydrogels. The hydrogels may be, but not limited to, polyurethane or poly(2-hydroxyethyl methacrylate) (Poly-HEMA). In addition, the tethering matrix and the hydrogels may be supported by a polymer support. The polymer support may be, but not limited to, PET.

Chemosensor 10 also includes fluorophore 14 bond to anchor 12. Fluorophore 14 selectively fluoresces only when an ion is bound. Fluorophore 14 may be anthracene, benzene, carbazole, diphenylfurane, naphthalene, 1,8-naphthalimide, N,N,N',N'-tetramethylbenzidine, porphyrin, or pyrene. Chemosensor 10 also includes spacer 16 bound to fluorophore 14. Non-limiting examples of materials that may be used as spacer 16 include methylamine and ethylamine. Chemosensor 10 also includes receptor 18 bond to spacer 16. Receptor 18 may coordinate to analytes (e.g., ions) for analyte detection.

The binding strength of an ion to receptor 18 may be related to a dissociation constant (e.g., a titration curve) based on the known equation (1):

$$K_d = c^0 e^{\Delta G/kT} \tag{1}$$

Figure 2:
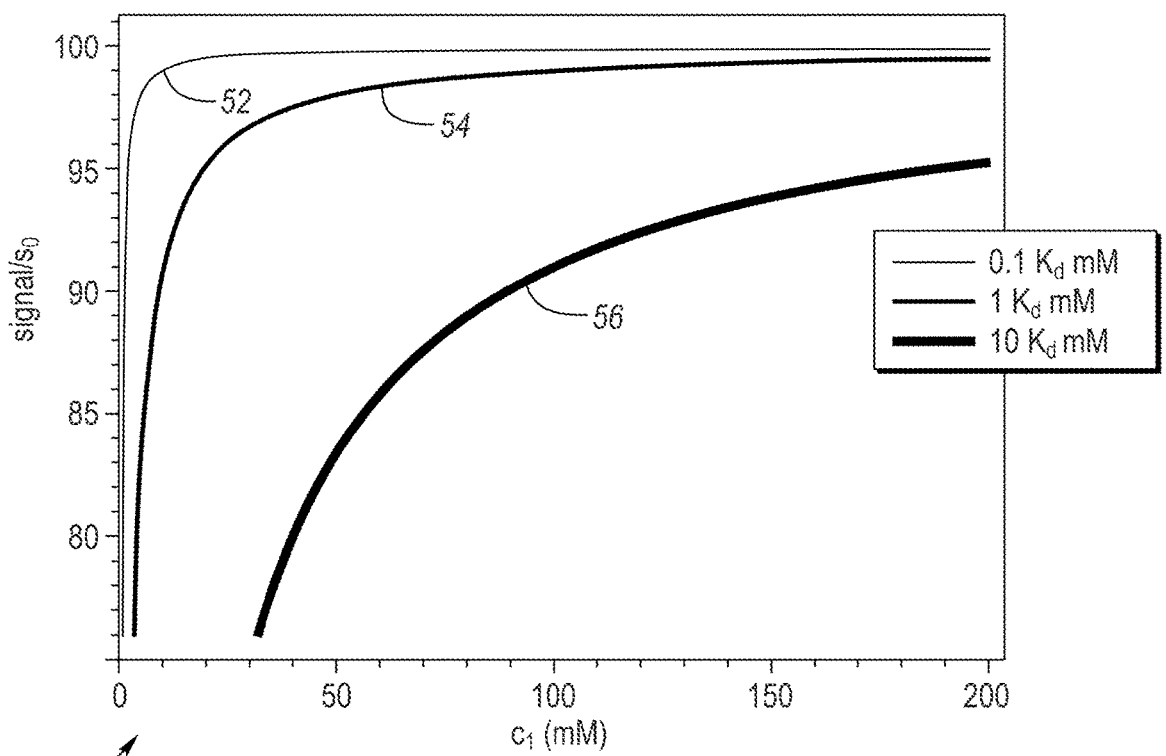
FIG. 2 depicts a graph of titration curves of a fluorescence signal as a concentration of an ion is increased.

$K_d$ is a dissociation constant. $c^0$ is a standard reference concentration (e.g., 1 mol). $kT$ is the Boltzmann constant times an absolute temperature. $\Delta G$ is a free energy of binding. The free energy of binding is typically on the order of −50 to −1000 meV, and equals E−TS, the energy of binding minus the absolute temperature times entropy. Other corrections can be added for correlated effects (e.g., the Hill coefficient). The binding energy is computed as the total energy of the molecule with the ion, minus the total energy of the molecule and ion separately (e.g., $\Delta E_{binding} = E_{0,total} - (E_{0,molecule} + E_{0,ion})$, where $E_0$ is the calculated internal energy that can be obtained from simulation). FIG. 2 depicts graph 50 with titration curves 52, 54, and 56 of a fluorescence signal as the concentration of an ion is increased. The dissociation constant $K_d$ gives sensitivity to different parts of the concentration range.

In one or more embodiments, receptor 18, and optionally other components of the chemosensor molecule shown in FIG. 1, is immobilized in a polymer thin film. Receptor 18, and optionally other components of the chemosensor molecule shown in FIG. 1, may be sensor-coated microparticles embedded in one or more thin hydrogel layers. Other embodiments include a water-soluble sensor dissolved into the water. The water-soluble sensor may contaminate the water, thereby making it unavailable for re-use. One or more embodiments may be applied to any immobilization architecture used.

A single receptor may bind more than one type of ion. For example, a receptor may strongly bind to $Ca^{2+}$ and weakly bind to $Na^+$. A strong binding may represent a very negative free energy of binding. A small value of $K_d$ may represent strong sensitivity. If there is a relatively low concentration of sodium ions in solution, then a single receptor binding to two analytes may not present an issue. However, it may be desired to distinguish the amounts of calcium and sodium ions, which are not distinguishable from a simple fluorescence observation or reading. One or more embodiments of the present disclosure distinguishes between the concentrations of first and second analytes (e.g., first and second ions).

Some water handling devices, both industrial and consumer, typically soften the water before usage. Non-limiting examples may include dishwashers, whole-home water softeners, steam ovens, and boilers. The water softening process typically exchanges divalent ions $Ca^{2+}$ and $Mg^{2+}$ with two monovalent $Na^+$ ions. This ion exchange process increases the overall $Na^+$ ion concentration in softened water (in the interest of reducing the divalent ions that cause deposits and residue). Therefore, the $Na^+$ ions may present an issue even if they are not present in the freshwater input (e.g., into a building), as such ions can be added during the softening process.

Further, temperature cross-sensitivity may exist between receptor 18 and temperature. For example, temperature may affect binding strength (e.g., dissociation constant), the fluorophore emission spectrum, and/or the detector. In embodiments of the present disclosure, a sensing device including a film sensor (e.g., a fluorescence sensor) and a conductivity sensor and/or a temperature sensor are disclosed to compensate for cross-sensitivity. One or more embodiments recognize that the cross-sensitivity of a film sensor (e.g., a fluorescence sensor) is distinct from the cross-sensitivity of a conductivity sensor and/or a temperature sensor. This distinction can be used to distinguish the signals to address cross-sensitivity. The use of a conductivity sensor and/or a temperature sensor to address cross-sensitivity is beneficial due to the relatively low cost of these types of additional sensors.

Figure 3:
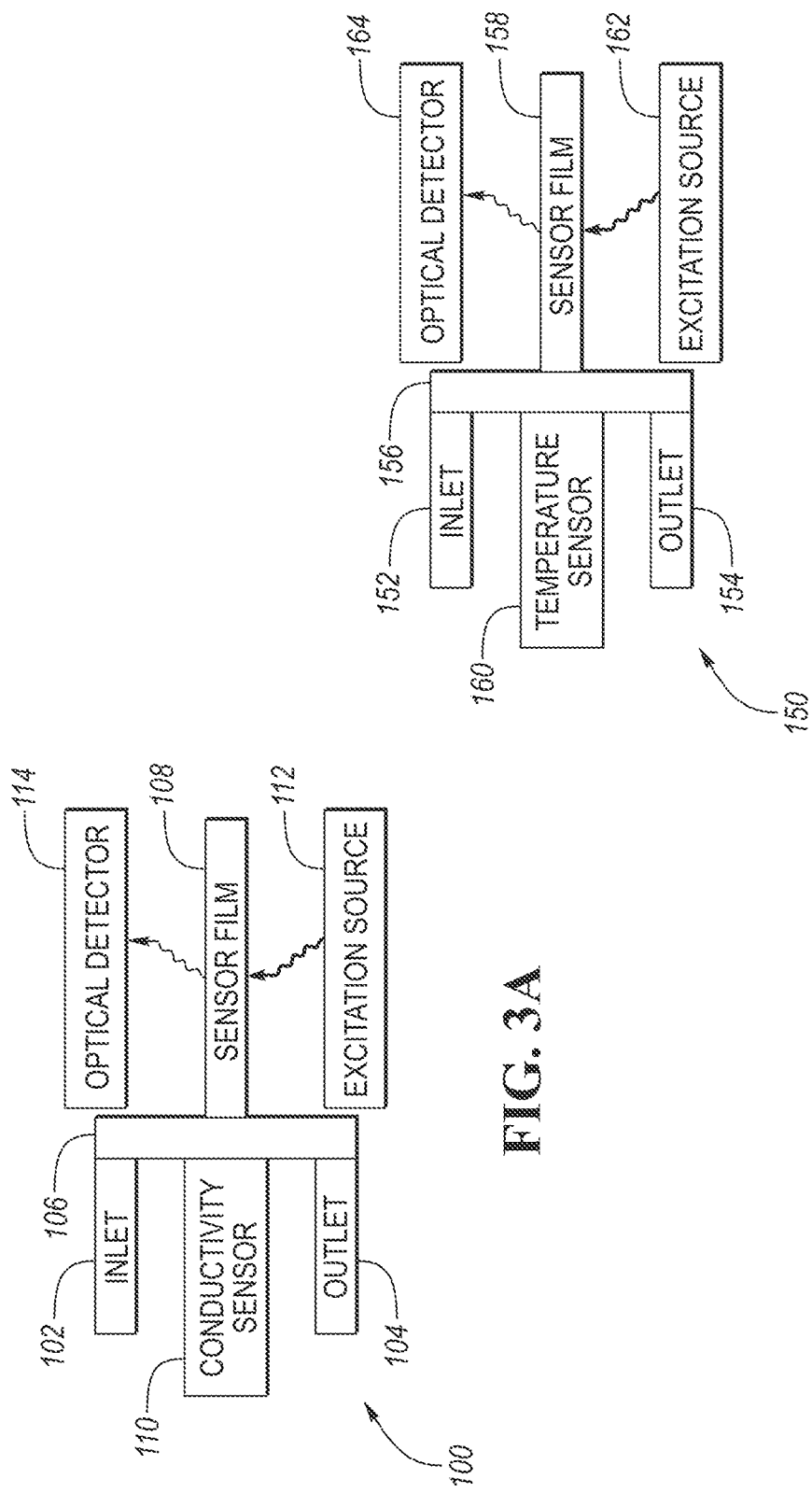
FIG. 3A depicts a schematic diagram of a sensing device according to a first embodiment.
FIG. 3B depicts a schematic diagram of a sensing device according to a second embodiment.

FIG. 3A depicts a schematic diagram of sensing device 100 according to a first embodiment. Sensing device 100 includes inlet 102 and outlet 104. Inlet 102 admits a fluid medium (e.g., water). Outlet 104 outlets the fluid medium (e.g., water). The fluid medium flows through conduit 106 situated between inlet 102 and outlet 104. Conduit 106 (and fluid medium) may be in contact with or in the vicinity of film sensor 108 and conductivity sensor 110.

Film sensor 108 may be a chemosensor (e.g., chemosensor 10). Excitation source 112 (e.g., excitation LED) excites fluorescence of fluorophore 14. Film sensor 108 produces the fluorescence, which is exposed to the fluid medium. Optical detector 114 (e.g., photoresistor or photodiode) detects the fluorescence.

Conductivity sensor 110 may be an ammeter measuring a flow of current of the fluid medium at a fixed voltage. In another embodiment, conductivity sensor 110 may be an inductive conductivity sensor measuring an induced current from a known magnetic field, which in turn is generated from a known voltage. Conductivity sensor 110 is connected to a voltage source (not shown) (e.g., battery or power grid).

A controller (not shown) is programmed to receive a signal from optical detector 114 associated with film sensor 108 and a signal from conductivity sensor 110. Controller may be connected to memory and disk storage. Controller may further be connected to a wired networking component or wireless networking component to transfer data (e.g., output signals from optical detector 114 associated with film sensor 108 and conductivity sensor 110) to a remote server.

FIG. 3B depicts a schematic diagram of sensing device 150 according to a second embodiment. Sensing device 150 includes inlet 152 and outlet 154. Inlet 152 admits a fluid medium (e.g., water). Outlet 154 outlets the fluid medium (e.g., water). The fluid medium flows through conduit 156 situated between inlet 152 and outlet 154. Conduit 156 (and fluid medium) may be in contact with or in the vicinity of film sensor 158 and temperature sensor 160.

Film sensor 158 may be a chemosensor (e.g., chemosensor 10). Excitation source 162 (e.g., excitation LED) excites fluorescence of fluorophore 14. Film sensor 158 produces the fluorescence, which is exposed to the fluid medium. Optical detector 164 (e.g., photoresistor or photodiode) detects the fluorescence.

Temperature sensor 160 may be in addition to or in substitute for conductivity sensor 110. In one embodiment, temperature sensor 160 is a thermistor. In another embodiment, temperature sensor 160 is a bimetallic strip.

A controller (not shown) is programmed to receive a signal from optical detector 164 associated with film sensor 158 and a signal temperature sensor 160. Controller may be connected to memory and disk storage. Controller may further be connected to a wired networking component or wireless networking component to transfer data (e.g., output signals from optical detector 164 associated with film sensor 158 and temperature sensor 160) to a remote server.

In one embodiment, first and second analytes (e.g., Mg and Na ions) are considered. The sensitivity of a sensor A to a particular analyte is given by the dissociation constant, $K_d$, which defines the ratio of a concentration of unbound to bound receptors, and its reciprocal the association constant $K_a$. For example, if the first analyte has dissociation constant of $K_d^{(A1)}$, then $K_d^{(A1)}$ is calculated from equation (2) reproduced below:

$$K_d^{(A1)} = c_1 c_{unb}/c_b \qquad (2)$$

c1 is the concentration of the first analyte. $c_{unb}$ is the concentration of unbound receptors, and $c_b$ is the concentration of bound receptors. The total signal (per receptor molecule) is given by equation (3) reproduced below:

$$\text{signal} = \frac{s_1 c_b + s_0 c_{unb}}{c_b + c_{unb}} \qquad (3)$$

$s_1$ is the signal when the analyte is bound. $s_0$ is the zero-point signal when the analyte is unbound. The relative signal signal/$s_0$ may resemble graph 50, which is an example for $s_1 = 100\ s_0$. Equation (4) represents the full formula and is reproduced below.

$$\frac{\text{signal}}{s_0} = \frac{1 + \frac{c_1 s_1}{K_d s_0}}{1 + \frac{c_1}{K_d}} \qquad (4)$$

The analogous formula for first and second analytes is given as equation (5) reproduced below $$\text{signal}_A = \frac{1 + \frac{c_1 s_1}{K_d^{A1 s_0}} + \frac{c_2 s_2}{K_d^{A2 s_0}}}{1 + \frac{c_1}{K_d^{A1}} + \frac{c_2}{K_d^{A2}}} \quad (5)$$

Figure 4:
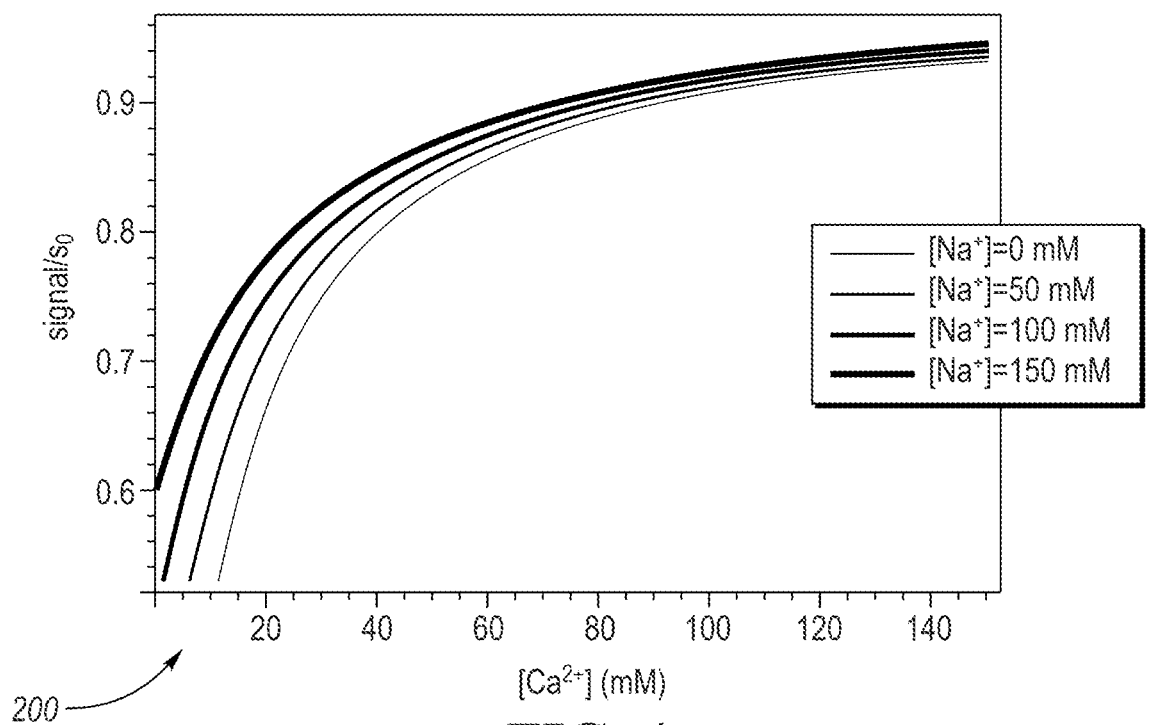
FIG. 4 is a graph of titration curves for calcium concentration based on different sodium concentrations.

FIG. 4 is graph 200 of titration curves for calcium concentration based on different sodium concentrations. In this example, the $K_d$ of sodium and calcium are 100 mM and 10 mM, respectively, and the signal $s_1$ equals $s_2$ equals $100 s_0$. The curves different based on the sodium concentration as shown by the titration curves shown in FIG. 4.

As opposed to the titration curves, the conductivity of an ion in solution may be given by the Nernst-Einstein equation (6), as reproduced below.

$$\sigma = \frac{z^2 F^2}{RT}(c_+ D_+ + c_- D_-) \quad (6)$$

σ is the conductivity. z is the charge of the ion. F is Faraday's constant. R is the gas constant. T is the temperature in Kelvin. $D_\pm$ or $c_\pm$ are the diffusivity or concentration of the positively or negatively charged species.

In a case where the only anion is Cl and using experimental values available at https://doi.org/10.1016/0304-4203(83)9002-6, and assuming room temperature, the conductivity is represented by the following equation (7). The experimental vales are $D_{Na,Ca,Cl}$=12.12, 7.29, 17.71 (units: $10^{-6}$ cm²/s) respectively.

$$\frac{\sigma}{S/m} = 0.065 \,[Ca] + 0.032 \,[Na] \quad (7)$$

Figure 5:
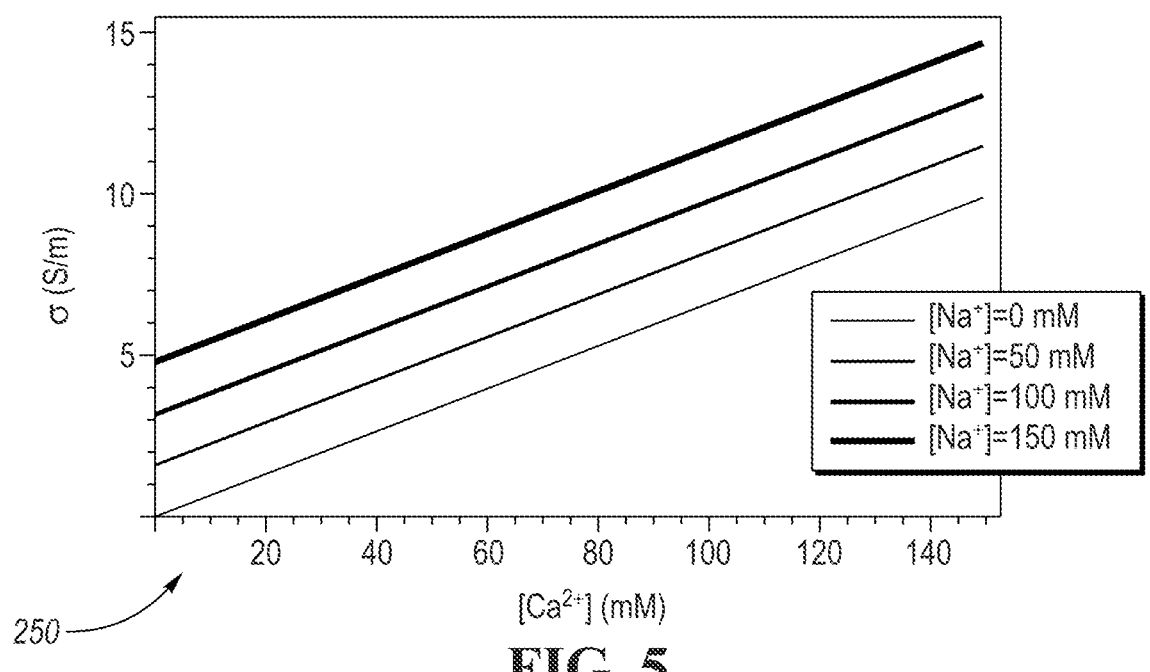
FIG. 5 depicts a graph including conductivity curves for a mixture of first and second analytes of calcium and sodium ions.

FIG. 5 depicts graph 250 including conductivity curves for a mixture of first and second analytes of Ca and Na ions as determined herein.

In one embodiment, a controller included with the sensing device is programmed to combine the conductivity and fluorescence measurements to extrapolate an actual first and second analyte concentration where the first and second analytes may be Ca and Na ions, for example. In one embodiment, the equation for the conductivity and fluorescence measurements reduce to equations (8) and (9) as shown below.

$$s = \frac{10 + 100\,[Ca] + 10\,[Na]}{1000 + 100\,[Ca] + 10\,[Na]} \quad \sigma = 0.0653\,[Ca] + 0.0317\,[Na] \quad (8),(9)$$

The calcium concentration may be solved (e.g., using computer software such as Wolfram Mathematica) and presented as shown in equation (10) below.

$$[Ca] \approx \frac{12.593(.01-s) + 3.971\sigma(1-s)}{s-1} \frac{12.593(.01-s) + 3.971\sigma(1-s)}{s-1} \quad (10)$$

σ is the conductivity in S/m. s is the normalized fluorescence signal. The calcium concentration can be plugged back into equation (9) to determine the sodium concentration.

In another embodiment, a similar approach is performed using a temperature sensor in combination with a fluorescence sensor. The temperature sensor may be calibrated experimentally. In another embodiment, using the above equations and aqueous entropies of binding of $S_{Ca}$=−24.2 cal/mol K and $S_{Na}$=8.9 cal/mol K (using the reference https://dx.doi.org/10.1139/v56-144), the calcium concentration is calculated using the following equation (11).

$$[Ca] \approx \frac{.194314 e^{2679.592/T}(.01-s) + 1.8423 T\sigma(1-s)}{(s-1)\left(10^{-6} e^{5664.726/T} - 35.25\right)} \quad (11)$$

Figure 6A:
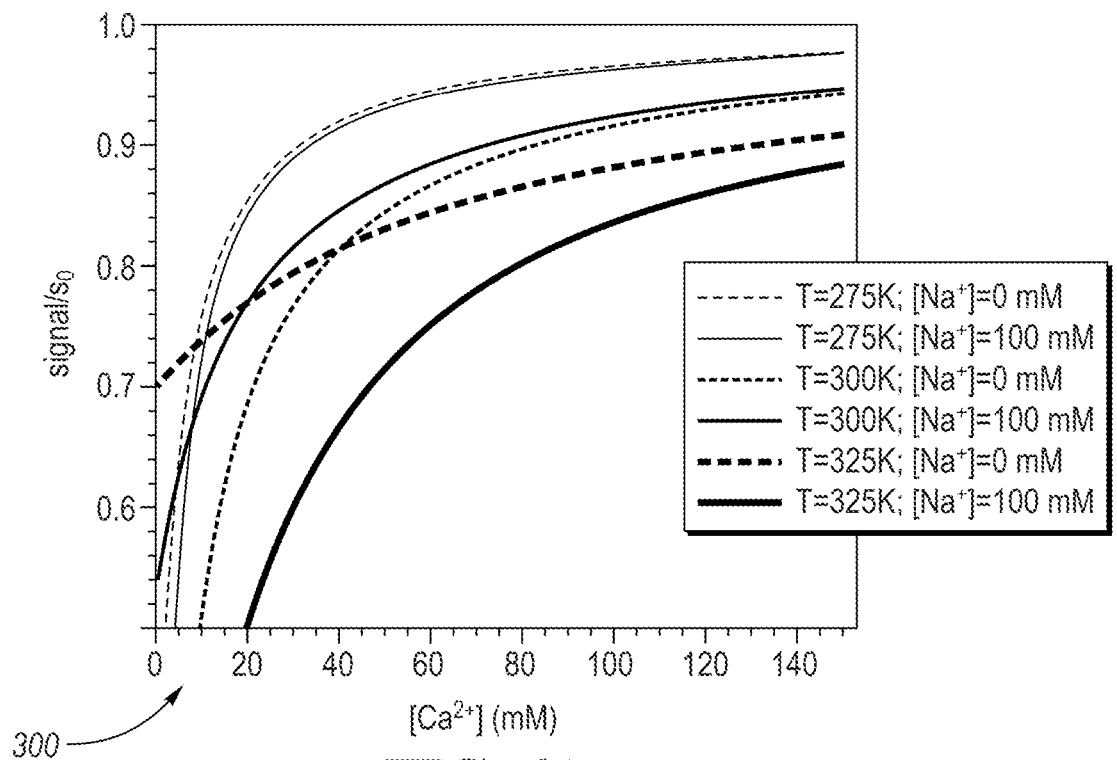
FIGS. 6A and 6B are graphs including calibration curves for equations (8) and (9) set forth below.
Figure 6B:
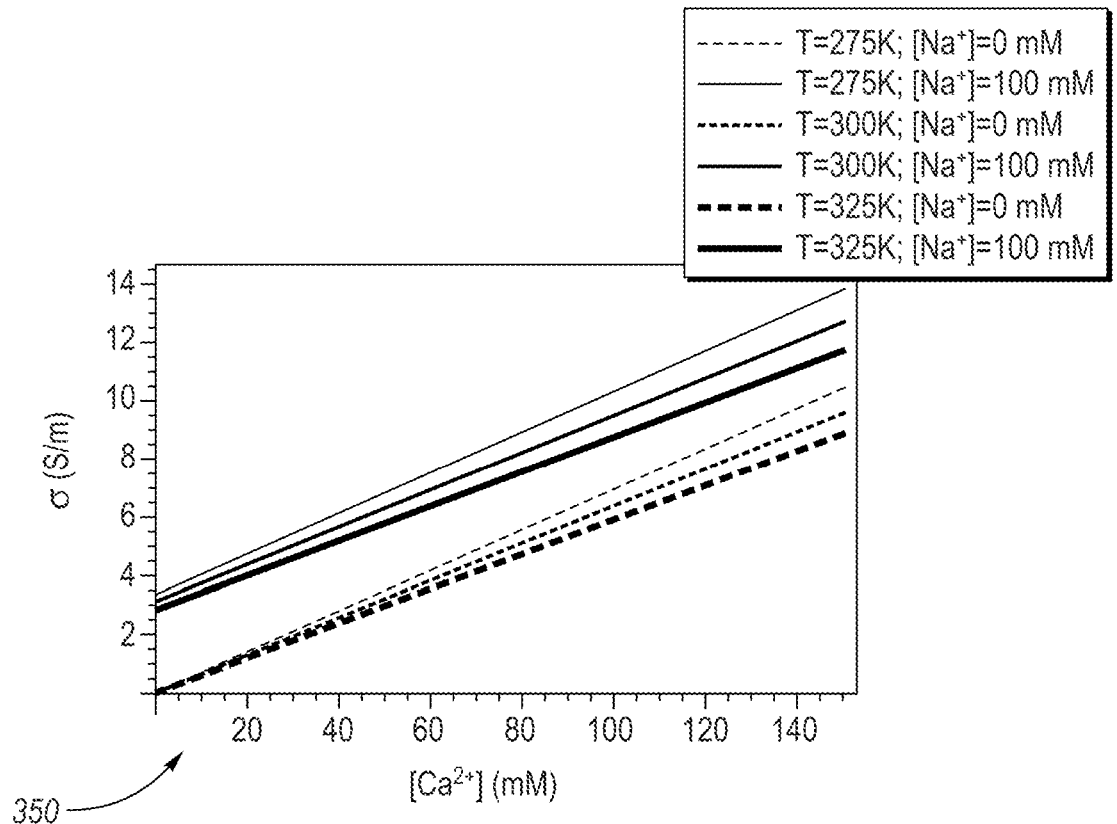

FIGS. 6A and 6B are graphs 300 and 350 including calibration curves, respectively, derived from equations (8) and (9), respectively.

In another embodiment, the controller included with the sensing device is programmed to combine fluorescence measurements with a cross-sensitivity measurement in a receptor (e.g., a single receptor chemistry) to extrapolate an actual first and second analyte concentration where the first and second analytes may be Ca and Na ions, for example. For instance, the cross-sensitivity measurement may be pH cross-sensitivity to pH ($H^+$ concentration).

The conductivity sensor measures the ability of a solution to conduct an electric current between two electrodes (e.g., metals such as platinum, gold, steel, or titanium, or non-metal materials such as graphite) in contact with the solution. Current flows through a solution due to ion transport. Therefore, a higher ion concentration (e.g., Na) results in higher conductivity values. Conductivity (C, units Siemens/cm) is calculated as follows using equation (12):

$$C = G \cdot K_c \quad (12)$$

G (Siemens) is the conductance of the solution. $K_c$ (cm$^{-1}$) is the cell constant and is calculated by the following equation (13).

$$K_c = d/A \quad (13)$$

d is the distance between the electrodes and A is the area of the electrode surface. A potential difference is applied between the two electrodes. The resulting current is proportional to the conductivity of the solution. This current is converted to voltage. An alternating current (frequencies between <100 Hz up to 50 kHz) may be applied between the probes to prevent complete ion migration between the two electrodes, thus preventing complete redox and polarization effects at the electrodes. Typical conductivity values for different NaCl concentrations in water are disclosed in the table below:

| NaCl density (W/V) % | Conductivity (mS/cm) |
| --- | --- |
| 0.1 | 2.0 |
| 0.2 | 3.9 |
| 0.3 | 5.7 |
| 0.4 | 7.5 |
| 0.5 | 9.2 |
| 0.6 | 10.9 |
| 0.7 | 12.6 |
| 0.8 | 14.3 |
| 0.9 | 16.0 |
| 1.0 | 17.6 |
| 1.1 | 19.2 |
| 1.2 | 20.8 |

| NaCl density (W/V) % | Conductivity (mS/cm) |
|---|---|
| 1.3 | 22.4 |
| 1.4 | 24.0 |
| 1.5 | 25.6 |
| 1.6 | 27.1 |
| 1.7 | 28.6 |
| 1.8 | 30.1 |
| 1.9 | 31.6 |
| 2.0 | 33.0 |

Figure 7:
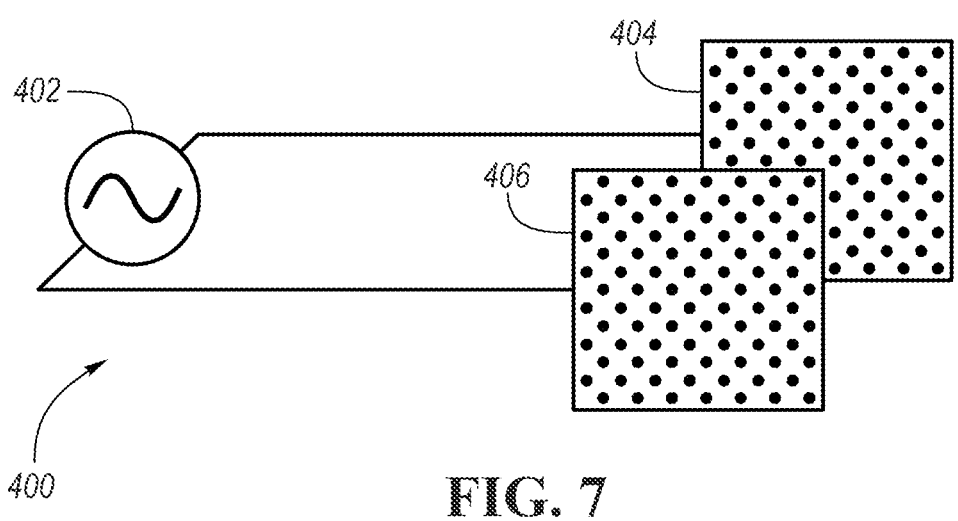
FIG. 7 depicts a schematic diagram of an ammeter measuring current between first and second electrodes at a known voltage difference.

The conductivity sensor may be an ammeter. FIG. 7 depicts a schematic diagram of ammeter 400 measuring current 402 between first and second electrodes 404 and 406 at a known voltage difference.

The following application is related to the present application: U.S. patent application Ser. No. 16/931,855 filed on Jul. 17, 2020 and issued as U.S. Pat. No. 11,579,085 on Feb. 14, 2023. This application is incorporated by reference in its entirety herein.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A sensing device comprising:
a film sensor including a receptor capturing an intended analyte and an unintended analyte in a fluid medium to generate a film sensor signal, the receptor has a receptor cross-sensitivity to the unintended analyte;
a second sensor contacting the fluid medium including the intended analyte and the unintended analyte to generate a second sensor signal, the second sensor has a second cross-sensitivity to the unintended analyte different than the receptor cross-sensitivity to the unintended analyte, the second sensor is a conductivity sensor generating the second sensor signal indicative of a conductivity of the fluid medium including the intended analyte and the unintended analyte, the conductivity sensor is an ammeter or an inductive conductivity sensor, the second cross-sensitivity is a conductivity cross-sensitivity represented at least partially by a Nernst-Einstein equation; and
a controller programmed to determine a concentration of the intended analyte in the fluid medium in response to the film sensor signal, the receptor cross-sensitivity, the second sensor signal, and the second cross-sensitivity.

2. The sensing device of claim 1, wherein the fluid medium is hard water, the intended analyte is calcium ions, and the unintended analyte is sodium ions.

3. The sensing device of claim 1, wherein the controller is further programmed to determine a concentration of the unintended analyte in response to the concentration of the intended analyte.

4. The sensing device of claim 1, further comprising a conduit communicating the fluid medium to the film sensor and the second sensor.

5. The sensing device of claim 1, wherein the conductivity sensor is the ammeter.

6. The sensing device of claim 1, wherein the conductivity sensor is the inductive conductivity sensor.

7. A sensing device comprising:
a film sensor including a receptor capturing an intended analyte and an unintended analyte in a fluid medium to generate a film sensor signal, the receptor has a receptor cross-sensitivity to the unintended analyte;
a second sensor contacting the fluid medium including the intended analyte and the unintended analyte to generate a second sensor signal, the second sensor has a second cross-sensitivity to the unintended analyte different than the receptor cross-sensitivity to the unintended analyte, the second sensor is a temperature sensor generating the second sensor signal indicative of a temperature of the fluid medium including the intended analyte and the unintended analyte; and
a controller programmed to determine a concentration of the intended analyte in the fluid medium in response to the film sensor signal, the receptor cross-sensitivity, the second sensor signal, and the second cross-sensitivity.

8. The sensing device of claim 7, wherein the temperature sensor is a thermistor or a bimetallic strip.

9. The sensing device of claim 7, wherein the second cross-sensitivity is a temperature cross-sensitivity represented at least partially by aqueous entropies of binding for the intended analyte and the unintended analyte.

10. The sensing device of claim 7, wherein the fluid medium is hard water, the intended analyte is calcium ions, and the unintended analyte is sodium ions.

11. The sensing device of claim 7, wherein the controller is further configured to determine a concentration of the unintended analyte in response to the concentration of the intended analyte.

12. The sensing device of claim 7, further comprising a conduit communicating the fluid medium to the film sensor and the second sensor.

13. A sensing device comprising:
a film sensor including a receptor capturing an intended analyte and an unintended analyte in a fluid medium to generate a film sensor signal, the receptor has a receptor cross-sensitivity to the unintended analyte; the receptor cross-sensitivity is represented at least partially the following signal equation:

$$\text{signal} = \frac{s_1 c_b + s_0 c_{unb}}{c_b + c_{unb}},$$

where $s_1$ is the film sensor signal when the intended analyte and the unintended analyte are captured by the film sensor, $c_b$ is a captured concentration of receptors capturing the intended analyte and the unintended analyte, $s_0$ is a zero-point signal when the intended analyte and the unintended analyte are unbound, and $c_{unb}$ is an uncaptured concentration of the intended analyte and the unintended analyte in an uncaptured state in the fluid medium;
a second sensor contacting the fluid medium including the intended analyte and the unintended analyte to generate a second sensor signal, the second sensor has a second cross-sensitivity to the unintended analyte different than the receptor cross-sensitivity to the unintended analyte; and
a controller programmed to determine a concentration of the intended analyte in the fluid medium in response to the film sensor signal, the receptor cross-sensitivity, the second sensor signal, and the second cross-sensitivity.

14. The sensing device of claim 13, wherein the fluid medium is hard water, the intended analyte is calcium ions, and the unintended analyte is sodium ions.

15. The sensing device of claim 13, wherein the controller is further configured to determine a concentration of the unintended analyte in response to the concentration of the intended analyte.

16. The sensing device of claim 13, further comprising a conduit communicating the fluid medium to the film sensor and the second sensor.

17. A sensing device comprising:
a film sensor including a receptor capturing an intended analyte and an unintended analyte in a fluid medium to generate a film sensor signal, the receptor has a receptor cross-sensitivity to the unintended analyte, the receptor cross-sensitivity is represented at least partially by a dissociation constant defined as a ratio of unbound to bound receptors;
a second sensor contacting the fluid medium including the intended analyte and the unintended analyte to generate a second sensor signal, the second sensor has a second cross-sensitivity to the unintended analyte different than the receptor cross-sensitivity to the unintended analyte; and
a controller programmed to determine a concentration of the intended analyte in the fluid medium in response to the film sensor signal, the receptor cross-sensitivity, the second sensor signal, and the second cross-sensitivity.

18. The sensing device of claim 17, wherein the fluid medium is hard water, the intended analyte is calcium ions, and the unintended analyte is sodium ions.

19. A sensing device comprising:
a film sensor including a receptor capturing an intended analyte and an unintended analyte in a fluid medium to generate a film sensor signal, the receptor has a receptor cross-sensitivity to the unintended analyte;
a second sensor contacting the fluid medium including the intended analyte and the unintended analyte to generate a second sensor signal, the second sensor has a second cross-sensitivity to the unintended analyte different than the receptor cross-sensitivity to the unintended analyte, the second sensor is a pH sensor generating the second sensor signal indicative of a pH of the fluid medium including the intended analyte and the unintended analyte; and
a controller programmed to determine a concentration of the intended analyte in the fluid medium in response to the film sensor signal, the receptor cross-sensitivity, the second sensor signal, and the second cross-sensitivity.

20. The sensing device of claim 19, wherein the second cross-sensitivity is a pH cross-sensitivity at least partially represented by a $H_+$ concentration.

* * * * *